United States Patent
Biegert et al.

(10) Patent No.: US 7,484,130 B2
(45) Date of Patent: Jan. 27, 2009

(54) CONFIGURING AN APPLICATION MONITOR UTILIZING DISCOVERED STRUCTURAL INFORMATION FOR AN APPLICATION UNDER TEST

(75) Inventors: Keith P. Biegert, Cary, NC (US); John M. Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 11/201,501

(22) Filed: Aug. 11, 2005

(65) Prior Publication Data

US 2007/0038895 A1 Feb. 15, 2007

(51) Int. Cl.
G06F 11/00 (2006.01)
(52) U.S. Cl. .............................. 714/47; 714/38; 702/186
(58) Field of Classification Search .................. 714/38, 714/47; 702/186
See application file for complete search history.

(56) References Cited

U.S. PATENT DOCUMENTS

| 6,259,448 | B1 | 7/2001 | McNally et al. | |
|---|---|---|---|---|
| 6,751,753 | B2 * | 6/2004 | Nguyen et al. | 714/39 |
| 2004/0083246 | A1 * | 4/2004 | Kahlouche et al. | 708/105 |
| 2005/0289401 | A1 * | 12/2005 | Goin et al. | 714/47 |
| 2006/0048011 | A1 * | 3/2006 | Dieffenderfer et al. | 714/38 |
| 2007/0016830 | A1 * | 1/2007 | Hasha | 714/38 |

OTHER PUBLICATIONS

INSPEC: *Manufacturing Resource Modeling of Process and Application in Cooperative Process Design*, AN-7476995; Li Shuang yue et al.
IBM Technical Disclosure Bulletin, vol. 37, No. 7, Jul. 1994, pp. 645-647, *Modeling Future Attributes*.
IBM Research Disclosure, *Dynamically structured Messaging Mechanism*, Apr. 2001, pp. 681-686.
Fraternali, Piero, *Tools and Approaches for Developing Data-Intensive Web Applications: A Survey*, ACM Computing Surveys, vol. 31, No. 3, Sep. 1999, pp. 227-263.
Russell, Michael, *Quality busters: Who's monitoring the application, anyway?*, IBM developerWorks.
Polozoff, Alexandre, *Proactive Application Monitoring*, IBM developerWorks.

* cited by examiner

*Primary Examiner*—Yolanda L Wilson
(74) *Attorney, Agent, or Firm*—David Irwin, Esq.; Steven M. Greenberg, Esq.; Carey Rodriguez Greenberg & Paul LLP

(57) ABSTRACT

A method, system and apparatus for configuring an application monitor utilizing discovered structural information for an application under test. A system for configuring an application monitor can include an application monitor disposed in a host computing platform. Also, the system can include an application inspector programmed to obtain snapshots of the host computing platform at discrete points of execution of an application under test. The snapshots can be used to identify differences in the host computing platform, and to configure the application monitor to account for the differences. Finally, the application inspector further can be programmed to acquire key system event data between the discrete points of execution.

7 Claims, 2 Drawing Sheets

CONFIGURING AN APPLICATION MONITOR UTILIZING DISCOVERED STRUCTURAL INFORMATION FOR AN APPLICATION UNDER TEST

BACKGROUND OF THE INVENTION

1. Statement of the Technical Field

The present invention relates to the field of application monitoring and more particularly to discovering structural information for an application under test for use in configuring an application monitor.

2. Description of the Related Art

Monitoring applications detect and respond to operational problems, oftentimes before the end user becomes aware of those problems. Consequently, application monitoring systems have become a common requirement, especially for revenue-generating production environments. Most administrators understand the need for application monitoring. Infrastructure teams, in fact, typically monitor the basic health of application servers by keeping an eye on CPU utilization, throughput, memory usage and the like. However, there are many parts to an application server environment, and understanding which metrics to monitor for each of these pieces differentiates the environments that can effectively anticipate production problems from those that might get overwhelmed by them.

When applied in an appropriate context, application monitoring is more than just the data that shows how an application is performing technically. Information such as page hits, frequency and related statistics contrasted against each other can also show which applications, or portions thereof, have consistently good or bad performance. Management reports generated from the collected raw data can provide insights on the volume of users that pass though the application. An online store, for example, could compare the dollar volume of a particular time segment against actual page hits to expose which pages are participating in higher or lower dollar volumes.

To properly configure a monitoring solution for a target application, it can be important to understand the structure and layout of the target application. In this regard, the gross static and dynamic structural information of the target application can provide critical baseline information required to construct a monitoring solution for the target application. Discovering the gross static and dynamic structural information for the target application, however, can be manually intensive and largely inadequate.

Specifically, the manual process of discovering the gross static and dynamic structural information for the target application can require a generic description of the target application, typically provided by the developer of the target application. Using the generic description, the testing engineer can architect a specific monitoring configuration. Finally, the monitoring configuration can be reduced to monitoring logic forming the foundation of the monitoring application. To produce the monitoring application in this manner, however, can be a labor intensive process that is both difficult and error-pone to construct, test, deploy and customize.

A key deficiency in the art is the correlation of static information contained in configuration files and similar information repositories with dynamic information obtained from the execution of the application. Well-known systems exist for tracking the files opened, read from, and written to during the application's normal lifecycle; similar systems exist for tracking the networking interfaces used, the TCP/IP ports used, and other operating system resources. No known system combines information from both sources to derive a description of both the actual behavior as well as the intended behavior, and to mine the combined information to determine how the actual behavior is specified from the configuration. Performing such a combination generally requires the insight, patience and judgement of one of extraordinary skill in the relevant arts.

SUMMARY OF THE INVENTION

The present invention addresses the deficiencies of the art in respect to application monitoring and provides a novel and non-obvious method, system and apparatus for configuring an application monitor utilizing discovered structural information for an application under test. In a preferred aspect of the invention, a system for configuring an application monitor can include an application monitor disposed in a host computing platform. Also, the system can include an application inspector programmed to obtain snapshots of the host computing platform at discrete points of execution of an application under test. The snapshots can be used to identify differences in the host computing platform, and to configure the application monitor to account for the differences.

In a preferred method of the invention, a method for configuring an application monitor can include executing an application under test in a host computing platform, obtaining snapshots of the host computing platform at discrete points of the execution, identifying differences in the host computing platform apparent from the snapshots, and configuring the application monitor to account for the differences. The executing step can include installing the application under test, configuring the application under test, starting the application under test, accepting traffic through the application under test, and stopping the application under test.

The obtaining step can include obtaining a separate snapshot for each of a file system and operating system in the host computing platform at the discrete points. In this regard, the separate snapshot for the file system can include recorded information regarding updated files and registry entries. Likewise, the separate snapshot for the operating system can include recorded information regarding at least one of running processes, services, daemons, and utilized resources. Optionally, the obtaining step can include the step of obtaining recording operating system calls and corresponding operating system call arguments in the host computing platform at the discrete points.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for configuring an application monitor utilizing discovered structural information for an application under test. In accordance with the present invention, the structure and layout of a target application can be discovered based upon information collected at several points in the application lifecycle. Those points can include prior to application installation, after installation but prior to startup, after startup but prior to request servicing, during request servicing, and after shutdown. The discovered information subsequently can be used to identify the essential monitoring requirement of the target application, to generate the configuration for corresponding resource models, and to identify additional information which can increase the capabilities of the monitoring application.

Figure 1:
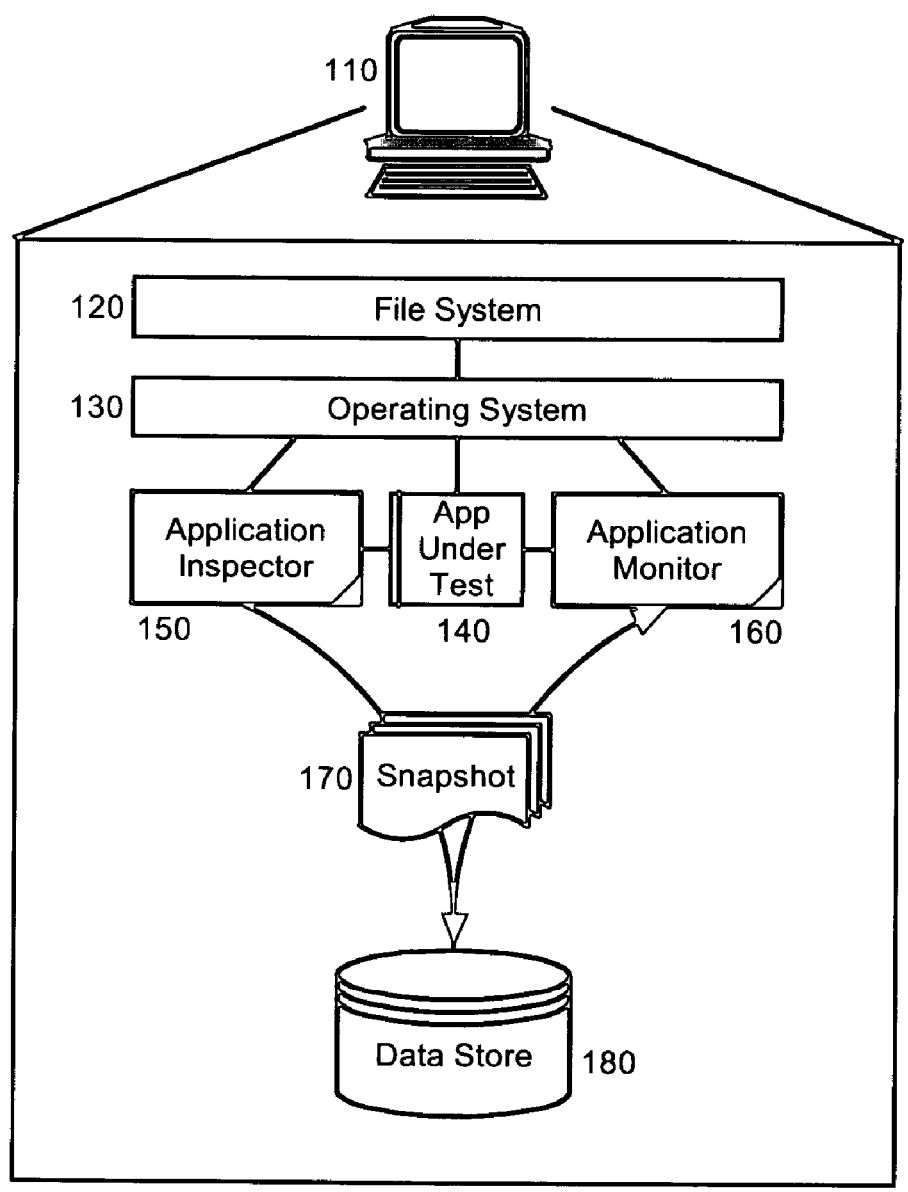
FIG. 1 is a schematic illustration of a computing platform configured to configure an application monitor utilizing discovered structural information for an application under test; and, FIG. 2 is a flow chart illustrating a process for discovering structural information for an application under test.

In further illustration, FIG. 1 is a schematic illustration of a computing platform arranged to configure an application monitor utilizing discovered structural information for an application under test. The computing platform 110 of the present invention can include an operating system 130 having an underlying file system 120. The operating system 130 can host a target application 140 in addition to an application inspector 150. The application inspector 150 can be configured to acquire application snapshots 170 at different stages of the lifecycle of the target application 140. The acquired snapshots 170 can be persisted in the data store 180 and subsequently utilized to configure an application monitor 160.

The snapshots 170 can include information pertaining to the file system 120. Examples can include registry information and file information. The snapshots 170 further can include information pertaining to the operating system 130. Examples can include a process list, a service list, a daemon list, and a list of consumed resources such as ports and handles. Optionally, the information pertaining to the operating system 130 can include information collected at a more granular level, including operating system calls and select arguments to those calls. Examples include information relating to the opening, reading and closing of configuration files and the opening, writing and closing of logging files.

Figure 2:
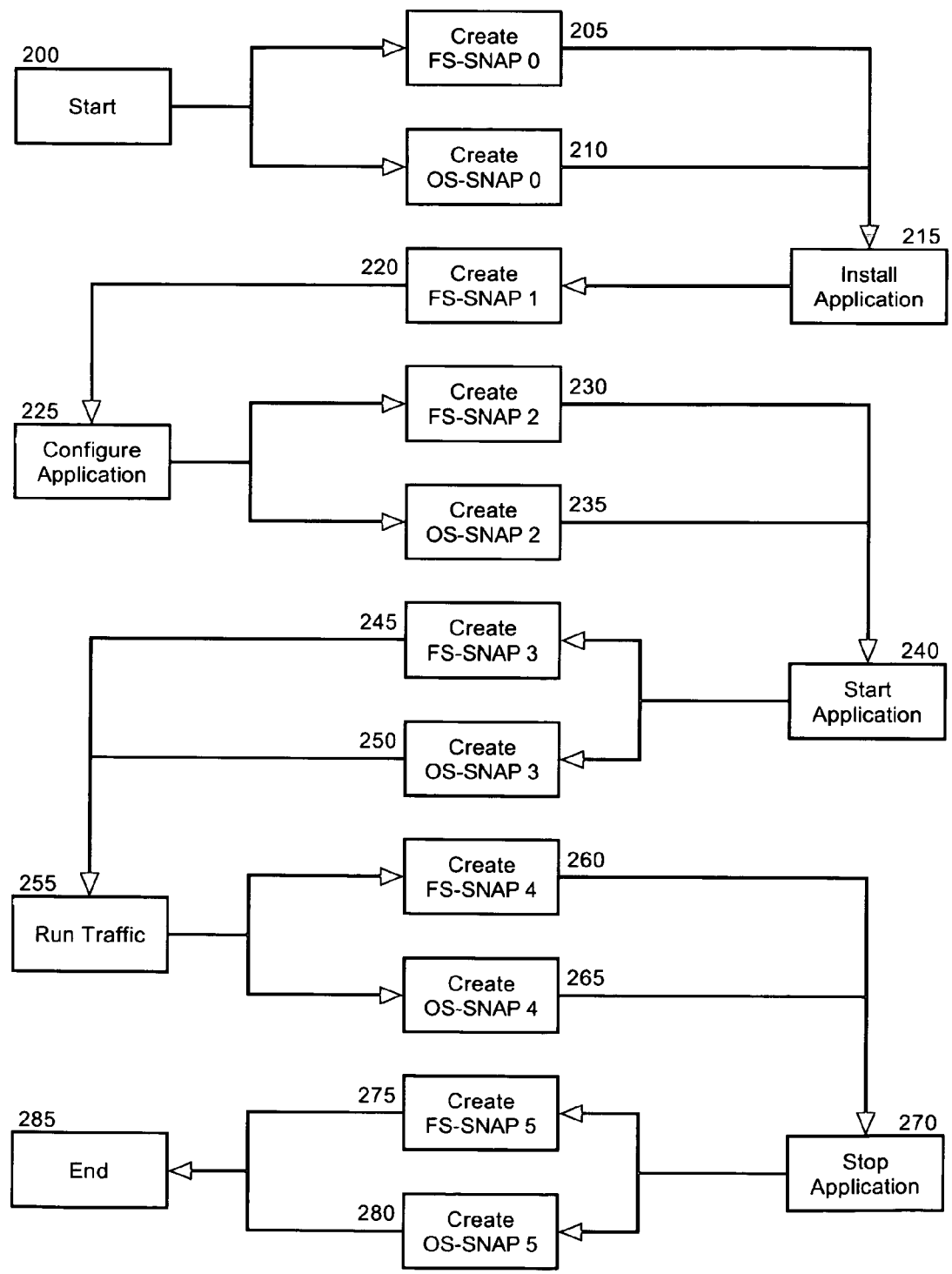

In further illustration, FIG. 2 is a flow chart illustrating a process for discovering structural information for an application under test. The process can begin in block 200 prior to the installation of the application under test and in blocks 205 and 210, snapshots can be acquired for each of the file system information and the operating system information, respectively. Subsequently, in block 215 the application under test can be installed. In block 220, a snapshot of the file system can be acquired prior to the configuration of the application under test in block 225.

Once the application under test has been configured in block 225, in blocks 230 and 235, additional snapshots can be acquired for the file system and operating system information, respectively. Subsequently, in block 240 the application under test can be started. Once the application under test has been started in block 240, in blocks 245 and 250, further snapshots can be acquired for the file system and operating system information, respectively. Subsequently, in block 255, traffic can run through the application under test.

While traffic runs through the application under test in block 255, in blocks 260 and 265, yet further snapshots can be acquired for the file system and operating system information, respectively. Subsequently, in block 270 the application under test can be stopped. Once the application under test has been stopped in block 270, in blocks 275 and 280, even further snapshots can be acquired for the file system and operating system information, respectively. Finally the process can end in block 285.

Utilizing the acquired snapshots, pairs of the file system snapshots and operating system snapshots can be compared in order to reveal the structure and layout of the target application. For instance, as between the initial and first file system snapshots, the difference in the snapshots can reveal the files created and the registry entries which have changed during application installation. Similarly, as between the first and second file system snapshots, the difference in the snapshots can reveal the files created and the registry entries which have changed during application configuration.

Likewise, as between the second and third file system snapshots, the difference in the snapshots can reveal the files created and the registry entries which have changed during application startup. Also, as between the third and fourth file system snapshots, the difference in the snapshots can reveal the files created and the registry entries which have changed in consequence of providing services through the application under test. Finally, as between the fourth and fifth file system snapshots, the difference in the snapshots can reveal the files created and the registry entries which have changed during stopping of the application.

Notably, in an embodiment of the invention, the snapshots can be used to identify a set of files that may be subjected to further analysis, including both effect analysis and content analysis. Effect analysis refers to the classification of a file by a creator or modifier and the manner of that modification. For example, an application may open certain files for writing or appending only during its normal operation. Such files are typically used to record "logging" or "tracing" (debug) information that can be useful in problem diagnosis when the application is not working. Application monitors often are able to parse and extract such logging and tracing files if they are able to find them: This requires configuration of an application log monitor.

Content analysis, by comparison, refers to the identification of a file as containing structured information typical of a configuration file, such as that found in a "*.ini" file or a "*.rc" file on certain operating system platforms, and correlating that structured information with observed dynamic behavior. For example, a file that contains the string "appLog.xml" may contain a configuration element locating an application logfile if the file "appLog.xml" is opened for writing/appending during the course of normal application operation. As such, tentative locative information for logfiles can be derived from the combination of effect analysis and content analysis. This locative information can be verified automatically by changing the putative configuration item and observing a subsequent execution to determine whether the expected behavioral change appears. If verified, the locative information can be used to generate a procedure for an application log monitor to extract that configuration information from the appropriate configuration file when the monitor is started.

In another embodiment of the invention, dynamically observed kernel operations and meta-data arising from those observed (or other unobserved) operations may be used to direct the acquisition of snapshots, or to improve the efficiency with which snapshots are processed. For example, applications often operate within a preferred "home directory," which is often a root directory for the majority of the configuration data manipulated by that application. By observing the home directory of an application, it is possible to focus attention on that directory for certain kinds of analyses. Similarly, by observing the processes started and the arguments passed to those processes, one can perform invocation analysis, the derivation of dynamic structure that occurs in response to specific requests or request types, workload pressure, or other specific or nonspecific (monitored or obscure) aspects of application behavior.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for configuring an application monitor comprising the steps of:
   executing an application under test in a host computing platform;
   obtaining snapshots of said host computing platform;
   identifying differences in said host computing platform apparent from said snapshots; and,
   configuring the application monitor to account for said differences, wherein said executing step comprises the steps of:
   installing said application under test;
   configuring said application under test;
   starting said application under test;
   accepting traffic through said application under test; and,
   stopping said application under test.

2. The method of claim 1, wherein said obtaining step comprises the step of obtaining a separate snapshot for each of a file system and operating system in said host computing platform at discrete points of said execution.

3. The method of claim 2, wherein said separate snapshot for said file system comprises recorded information regarding updated files and registry entries.

4. The method of claim 2, wherein said separate snapshot for said operating system comprises recorded information regarding at least one of running processes, services, daemons, and utilized resources.

5. The method of claim 1, wherein said obtaining step comprises the step of obtaining recording operating system calls and corresponding operating system call arguments in said host computing platform at said discrete points.

6. The method of claim 1, wherein said obtaining step comprises the step of obtaining snapshots of said host computing platform at critical behavioral events continuously throughout execution.

7. The method of claim 6, wherein said identifying step comprises the step of identifying differences in said host computing platform apparent from said critical behavioral events.

* * * * *